(12) United States Patent
Lu et al.

(10) Patent No.: US 11,442,742 B2
(45) Date of Patent: Sep. 13, 2022

(54) METHOD AND SYSTEM FOR CONSTRUCTING LIGHTWEIGHT CONTAINER-BASED USER ENVIRONMENT (CUE), AND MEDIUM

(71) Applicant: National University of Defense Technology, People's Liberation Army of China, Changsha (CN)

(72) Inventors: Kai Lu, Changsha (CN); Wenzhe Zhang, Changsha (CN); Ruibo Wang, Changsha (CN); Yinghui Gao, Changsha (CN); Wanqing Chi, Changsha (CN); Enqiang Zhou, Changsha (CN); Min Xie, Changsha (CN); Yong Dong, Changsha (CN); Wei Zhang, Changsha (CN); Jiaxin Li, Changsha (CN); Mingtian Shao, Changsha (CN)

(73) Assignee: National University of Defense Technology, People's Liberation Army of China, Changsha (CN)

( * ) Notice: Subject to any disclaimer, the term of this patent is extended or adjusted under 35 U.S.C. 154(b) by 316 days.

(21) Appl. No.: 16/946,932

(22) Filed: Jul. 12, 2020

(65) Prior Publication Data
US 2021/0011740 A1 Jan. 14, 2021

(30) Foreign Application Priority Data
Jul. 12, 2019 (CN) .......................... 201910629599.8

(51) Int. Cl.
*G06F 9/46* (2006.01)
*G06F 9/445* (2018.01)
(Continued)

(52) U.S. Cl.
CPC .......... *G06F 9/44505* (2013.01); *G06F 9/485* (2013.01); *G06F 9/4843* (2013.01); *G06F 9/4881* (2013.01); *G06F 9/545* (2013.01)

(58) Field of Classification Search
CPC ........................................................ G06F 9/46
See application file for complete search history.

(56) References Cited

U.S. PATENT DOCUMENTS

| | | | |
|---|---|---|---|
| 11,157,331 B1 * | 10/2021 | Wier | G06Q 10/0833 |
| 2009/0125711 A1 * | 5/2009 | Schneider | G06F 21/53 |
| | | | 713/100 |

(Continued)

*Primary Examiner* — Jae U Jeon
(74) *Attorney, Agent, or Firm* — Bookoff McAndrews, PLLC (57) ABSTRACT

A method and system for constructing a lightweight container-based user environment (CUE), and a medium, the method including: preparing, by a main process, for communication, cloning a child process, and then becoming a parent process; elevating, by the child process, permission, executing namespace isolation, and cloning a grandchild process, and setting, by the parent process, cgroups for the grandchild process; and setting, by the grandchild process, permission of the grandchild process to execute a command and a file, preparing an overlay file system, setting a hostname, restricting permission, and executing an initialization script to start the container. Multiple users are allowed to customize their own environments, enabling the users to customize their environments more flexibly, achieving privacy isolation, and making it easier and more secure to update a system. Therefore, it is particularly applicable to a high-performance computing cluster.

20 Claims, 4 Drawing Sheets

(51) Int. Cl.
*G06F 9/48* (2006.01)
*G06F 9/54* (2006.01)

(56) References Cited

U.S. PATENT DOCUMENTS

| | | | |
|---|---|---|---|
| 2013/0227652 A1* | 8/2013 | Choi | G06F 9/445 |
| | | | 726/4 |
| 2014/0181950 A1* | 6/2014 | Hadas | G06F 21/00 |
| | | | 726/12 |
| 2018/0189339 A1* | 7/2018 | Ananthakrishnan | G06F 16/2282 |

* cited by examiner

METHOD AND SYSTEM FOR CONSTRUCTING LIGHTWEIGHT CONTAINER-BASED USER ENVIRONMENT (CUE), AND MEDIUM

CROSS REFERENCE TO RELATED APPLICATION

The present application claims priority to the Chinese application No. 201910629599.8, filed on Jul. 12, 2019, which is herein incorporated by reference in its entirety.

TECHNICAL FIELD

The present invention relates to computer system software and virtualization technologies, and specifically, to a method and system for constructing a lightweight container-based user environment (CUE), and a medium.

BACKGROUND

Modern operating systems are all multi-user systems that allow multiple users to use a computer or a server simultaneously without affecting each other. In this scenario, there are two types of users: system administrator (root) and normal user (non-root user). Root user has full control of the system and is mainly responsible for maintaining the system environment on which non-root users run their daily jobs.

A current sharing model for the multi-user systems has the following problems:

1. Privacy: Users are visible to each other in terms of running processes and files. For example, a user can see what other users are running (using a ps command) and files. When multiple users share a server, the users may not want such privacy exposure to occur.

2. Environment customization: Non-root users want to customize their own system environments. For example, some users may have an application linked to a special library that needs to be located in /lib or /usr/lib, some users want a specific version of glic, and some users want to change a configuration file of sshd located in /etc as required. Not all of these different user requirements can be met in the current operating system.

3. Insecure system update: When the root user wants to upgrade the system environment, for example, the process of upgrading libs may cause the system to crash or become unstable, resulting in a lot of efforts required to restore the original system environment.

The foregoing problems are common, and there have been many tools to resolve some but not all of the problems. For example, an application container (for example, a docker) resolves the problem of application dependencies on various libraries, but does not involve the problem of user privacy and secure system upgrade. A system container (for example, LXC or openvz) or a virtual machine may provide a complete private environment for each user, but most of the time this is a heavyweight implementation. In addition, this also changes the multi-user sharing model, and each user is an administrator of their own environment. For the root user, the virtual machine is like a black box, and it is difficult to manage the environment in the virtual machine for each user. Arguably, the model is too isolated and weighty. Above all, to share a computer, we often do not need virtual machines or application containers, we just need a more isolated and more flexible environment to enhance the multi-user sharing model.

With this background, a new lightweight CUE is proposed, which is a new container somewhere between an application container and a system container: a user container. Its goal is to optimize and enhance the multi-user notion of current operating system and being lightweight. The following first briefly describes the background technologies related to the present invention.

I. Namespace

The namespace mechanism is a means used in the Linux kernel to implement Linux resource isolation. For common PIDs, IPCs, or the like, these system resources are no longer global resources, but belong to a specific namespace only. Resources belonging to one namespace are transparent and invisible to other namespaces. In other words, at the level of the operating system, there may be two processes with the same PID, and there is no conflict between them because they belong to different namespaces (as shown in FIG. 1).

Figure 1:
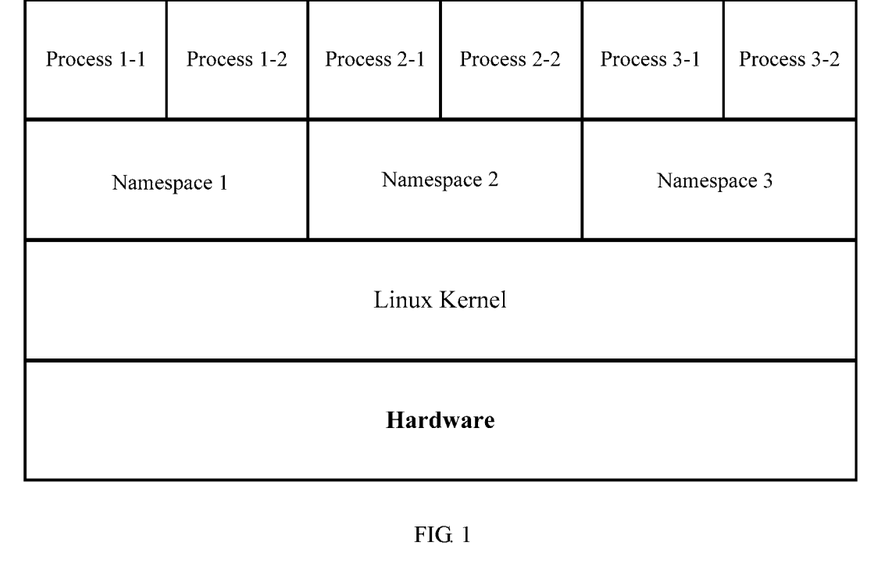
FIG. 1 is a principle diagram of namespace isolation in the prior art.

It can be clearly seen from FIG. 1 that there may be multiple namespace spaces on top of the Linux kernel, and each namespace has its own dedicated processes. For example, if the ps command is used, only processes in the current namespace can be listed, and processes in other namespaces are invisible. This achieves Linux isolation.

Currently, there are six major types of Linux namespaces: MNT namespace, IPC namespace, net namespace, UTS namespace, PID namespace, and user namespace.

1. MNT namespace: used to provide isolation capabilities for disk mount points and file systems.

2. IPC namespace: used to provide isolation capabilities for interprocess communication.

3. Net namespace: used to provide network isolation capabilities.

4. UTS namespace: used to provide hostname isolation capabilities.

5. PID namespace: used to provide process isolation capabilities.

6. User namespace: used to provide user isolation capabilities.

II. Cgroups

Cgroups is a mechanism provided by the Linux kernel to consolidate (or separate) a series of system tasks and their sub-tasks into hierarchical groups of resources based on specific behaviors, thereby providing a unified framework for system resource management. Simply put, the cgroups can record, limit, and isolate resources used by process groups, that is, physical resources such as CPU, memory, and I/O, which is significant for the container technology, and arguably is the basis for enabling most virtualization tools. The cgroups has the following major functions.

1. Resource Limitation: The cgroups can set an upper limit for the number of resources used by a process group. For example, OOM, namely, out of memory, is reported once the number of resources exceeds a configured memory limit.

2. Prioritization: This is mainly to allocate the number of CPU time slices and the bandwidth of hard disk I/O, which is actually controlling running priorities of processes.

3. Resource accounting: One major function of the cgroups is to count some information, such as memory usage or CPU usage time. This feature is very convenient for billing purposes.

4. Process control: The cgroups can perform operations such as suspending and resuming on the processes.

The cgroups has the following major features.

1. An API of the cgroups is implemented through a pseudo file system. In other words, a user organizes and manages the cgroups through file operations.

2. The cgroups are organized and managed in units of operation down to the thread level. User-mode code also has permission to create and destroy cgroups on resources that have been allocated to the system, allowing for resource re-management and reallocation.

3. Resource management functions are all implemented through the "subsystem" and all interfaces are uniform.

4. A child process is located in the same cgroup as its parent process upon creation.

In essence, the cgroups can be considered as a series of hooks attached to a program by the Linux kernel. The corresponding hooks are triggered by resource scheduling when the program is running, thereby enabling resource tracking and limiting.

III. Overlay File System

The overlay file system is a union mount file system with a simple design and a high speed. During implementation, the overlay file system is divided into two layers: a lower layer, used to store file information of the underlying system; and an upper layer, used to store information of the container. A merged layer integrates the two layers and provides a uniform merged file system externally (as shown in FIG. 2).

Figure 2:
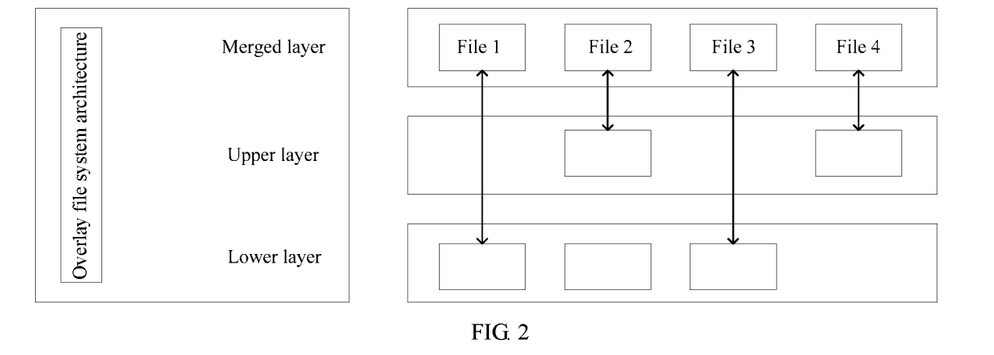
FIG. 2 is a principle diagram of an overlay file system in the prior art.

It can be seen from FIG. 2 that a file existing on the lower layer but not on the upper layer is directly used for the merged layer. A file existing only on the upper layer, that is, a file created by a container user is naturally used for the file system externally provided on the merged layer. In addition, this file has no impact on the underlying lower layer. For a file existing on both the upper layer and the lower layer, only the file on the upper layer is used for the merged layer. That is, the upper layer overwrites the file with the same name on the lower layer. (This is seemingly true only for an interface externally provided by the merged layer, but actually, the lower layer is not really overwritten off the disk).

In other words, the lower layer is a read-only layer, while the upper layer is a writable layer. The file system externally provided by the merged layer searches the upper layer first, and then reads the lower layer only when there is no target file on the upper layer.

If the container user wants to modify a file that previously exists only on the lower layer, the container user first copies the file in a read-only manner from the lower layer to the upper layer, and then modifies the file on the upper layer. The modification result is stored on the upper layer.

The container user may directly delete a file that exists on the upper layer. But if the file exists only on the lower layer, that is, if the file belongs to the underlying file system, it is obviously inappropriate to remove it from the underlying file system. How is it possible to ensure that the file is seemingly deleted from the file system externally provided on the merged layer without really deleting the file? This is actually achievable. When deleting a file, an overlay storage drive creates a new without file on the upper layer, for hiding the target file on the lower layer. If a container intends to delete a directory that exists only on the lower layer, the overlay storage drive creates a new opaque directory on the upper layer, for hiding the target directory on the lower layer. In this case, a user of the container may consider that the user has actually performed a delete operation successfully. However, the lower layer is not affected regardless of how container users add, delete, or modify files and directories in their file systems. In addition, the overlay file system also has the advantage of supporting sharing of a page cache. That is, multiple containers simultaneously accessing the same file can share the same page cache. This can improve memory usage.

In summary, the existing multi-user operating system cannot protect privacy of the users, cannot meet requirements of different users for system environment customization, and cannot ensure security during system upgrade. How to overcome the foregoing technical disadvantages and achieve the construction of a lightweight CUE has become a key technical problem that urgently needs to be resolved.

SUMMARY

To resolve the foregoing problems of the prior art, the present invention provides a method and a system for constructing a lightweight CUE, and a medium. It allows multiple users to customize their own environments, enabling the users to customize their environments more flexibly, achieving privacy isolation, and making it easier and more secure to update a system. Therefore, the method is particularly applicable to a high-performance computing cluster.

To resolve the foregoing technical problems, the technical solution adopted by the present invention is as follows:

A method for constructing a lightweight CUE is provided, where the method includes the following steps:

(1) preparing, by a main process used to execute user environment construction, a socket pair for interprocess communication, calling a clone function clone( ) to obtain a child process, and serving the main process as a parent process of the child process;

(2) elevating permission of the child process, executing namespace isolation, calling the clone function clone( ) to obtain a grandchild process, and sending a process identification PID of the grandchild process to the parent process, and setting, by the parent process, cgroups for the grandchild process according to the process identification PID; and (3) setting, by the grandchild process, permission of the grandchild process to execute a command and a file, then as an independent process, sequentially preparing an overlay file system of the grandchild process, setting a hostname, and limiting permission by using a capability mechanism of a Linux kernel, completing these preparations, and finally executing an initialization script init.sh to start the container.

Preferably, the step (2) specifically includes the following steps:

(2.1) executing, by the child process, setresuid(0,0,0) so that the child process has permission of a root user, isolating a namespace, and retaining a user namespace and a net namespace not isolated, where the isolating a namespace includes isolating an MNT namespace, an IPC namespace, a UTS namespace, and a PID namespace;

(2.2) calling, by the child process, the clone function clone( ) to obtain the grandchild process, and sending, by the grandchild process, a communication-ready message to the parent process, and waiting for a response from the parent process; and (2.3) sending, by the child process, the process identification PID of the grandchild process to the parent process, sending, by the parent process, an acknowledgment feedback to the child process after successfully receiving the message, and sending, by the child process after receiving the acknowledgment feedback, a message to the parent process to notify the parent process that a task of the child process has been completed; and meanwhile, setting, by the parent process, cgroups for the grandchild process after receiving the communication-ready message sent by the grandchild process, and sending a message to the grandchild process to notify the grandchild process that the grandchild process has obtained a resource.

Preferably, in the step (2.2), after the calling, by the child process, the clone function clone( ) to obtain the grandchild process, the process identification PID of the grandchild process in a new namespace is 1.

Preferably, the step (3) specifically includes the following steps:

(3.1) calling, by the grandchild process, setsid( ) after receiving a message, so that the grandchild process becomes a leading process of a new session to prevent the grandchild process from becoming an orphaned process after the parent process ends; then calling setuid(0) so that a command can be executed with root permission; then calling setgid(0) so that a file can be executed with permission of a group to which the file belongs; and finally sending a message to the parent process to confirm end of communication; and (3.2) after the communication ends, sequentially preparing, by the grandchild process as an independent process, the overlay file system of the grandchild process, setting the hostname, and limiting the permission by using the capability mechanism of the Linux kernel, completing these preparations, and finally executing the initialization script init.sh to start the container.

Preferably, the preparing an overlay file system of the grandchild process is specifically overlapping an empty folder on "/" of a host based on the overlay file system, changing the root to a merged folder, binding user directories of other users, and mounting an empty folder to the merged folder to hide content.

The present invention further provides a system for constructing a lightweight CUE, including a computer device, where the computer device is programmed or configured to perform the steps of the foregoing method for constructing a lightweight CUE in the present invention.

The present invention further provides a system for constructing a lightweight CUE, including a computer device, where a storage medium of the computer device stores a computer program that is programmed or configured to perform the foregoing method for constructing a lightweight CUE in the present invention.

The present invention further provides a computer readable storage medium, where the computer readable storage medium stores a computer program that is programmed or configured to perform the foregoing method for constructing a lightweight CUE in the present invention.

Compared with the prior art, the lightweight CUE constructed by using the method for constructing a lightweight CUE in the present invention has the following advantages:

1. When logging in to a server, a non-root user automatically logs in to a special container representing the user's own user environment. This environment is the same as a standard environment managed by a root user. The non-root user becomes a root user in his/her own user environment. The non-root user can view and modify almost all of the files on a host (but does not have these permissions on some special files), so that the non-root user can customize his/her own environment flexibly. In addition, the non-root user cannot see processes or files of other users, nor can other users see any modification by the non-root user, thereby ensuring privacy.

2. When the root user intends to update the system environment, all users in the container will see the update immediately. For example, if the root user adds a new library to /lib, all non-root users will immediately see the new library, even if they are isolated in different user environments.

3. Use of the overlay file system can allow multiple users to customize their own environments, enabling the users to customize the environments more flexibly. When a non-root user customizes his/her own environment, for example, replaces an original library in /lib with another special version of library, the customization has the highest priority. In other words, if the root user subsequently updates the system environment and replaces the library with a new version, the non-root user can still see his/her customized library, while all other users having no customized libraries see the version updated by the root user.

4. To achieve safe system update, the root user can also open a new user container, which has the same environment with the host at creation time. Then the root user can do all the update, test them well, and then do the update to the host environment.

In summary, the method can allow multiple users to customize their own environments, enabling the users to customize their environments more flexibly, achieving privacy isolation, and making it easier and more secure to update a system. Therefore, the method is particularly applicable to a high-performance computing cluster.

DETAILED DESCRIPTION

Figure 3:
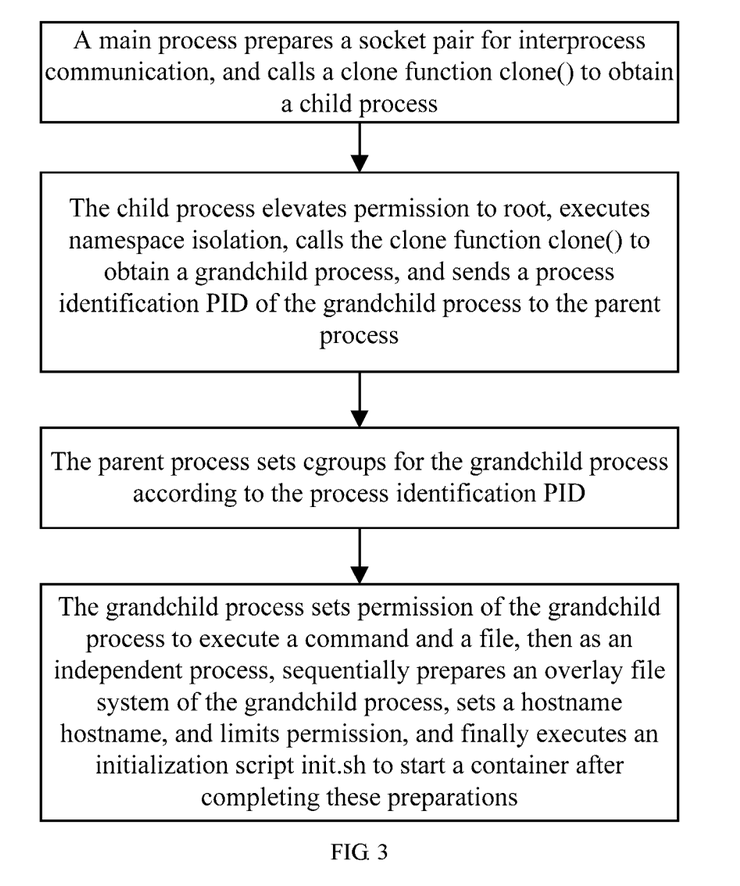
FIG. 3 is a schematic diagram of a basic procedure according to an embodiment of the present invention.

As shown in FIG. 3, a method for constructing a lightweight CUE in this embodiment includes the following steps:

(1) A main process used to execute user environment construction prepares a socket pair for interprocess communication, calls a clone function clone( ) to obtain a child process, and serves the main process as a parent process of the child process.

(2) The child process elevates permission, executes namespace isolation, calls the clone function clone( ) to obtain a grandchild process, and sends a process identification PID of the grandchild process to the parent process, and the parent process sets cgroups for the grandchild process according to the process identification PID.

(3) The grandchild process sets permission of the grandchild process to execute a command and a file, then as an independent process, sequentially prepares an overlay file system of the grandchild process, sets a hostname, and limits permission by using a capability mechanism of a Linux kernel, and executes an initialization script init.sh to start the container after completing these preparations.

This embodiment involves three processes: the parent process, the child process, and the grandchild process. The parent process is a process running when the system executes a script of starting the container. The process is mainly used to create the child process and set cgroups for the grandchild process after the grandchild process is created. The child process is used to isolate all namespaces other than a user namespace and a net namespace after obtaining root permission, thereby creating the grandchild process in a new namespace. The grandchild process is used to, after serving as an independent process, set a file system and a hostname, limit permissions by using a capability mechanism of a Linux kernel, and execute the container initialization script to start the container.

Figure 4:
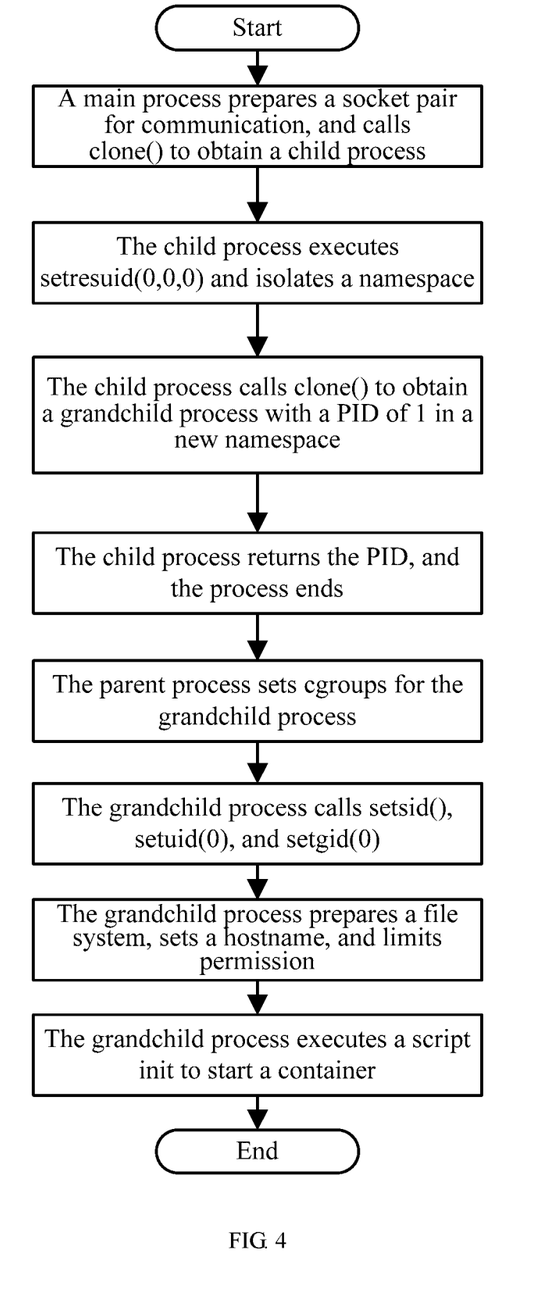
FIG. 4 is a schematic diagram of a detailed procedure according to an embodiment of the present invention.
Figure 5:
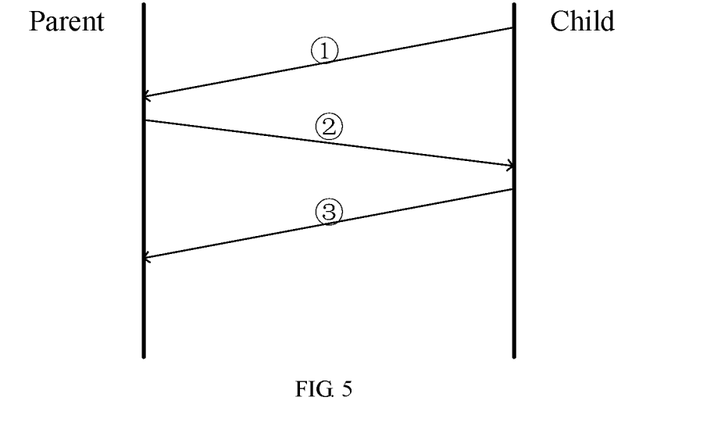
FIG. 5 shows a communication process between a parent process and a child process in a lightweight CUE according to an embodiment of the present invention.
Figure 6:
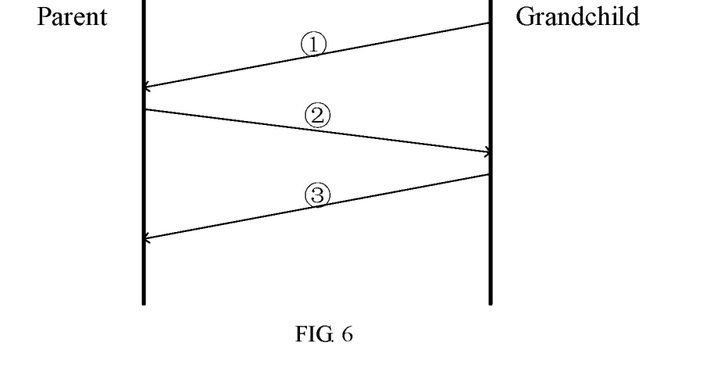
FIG. 6 shows a communication process between a parent process and a grandchild process in a lightweight CUE according to an embodiment of the present invention.

Referring to FIG. 4, FIG. 5, and FIG. 6, the step (2) specifically includes the following steps:

(2.1) The child process executes setresuid(0,0,0) so that the child process has permission of a root user, isolates a namespace, and retains a user namespace and a net namespace not isolated. The reason for not isolating the user namespace is that the Linux kernel is not mature in this area, and there may be a security problem. Once the user namespace is isolated, the permission elevation of the child process can be performed only by the parent process. Therefore, the child process can be granted the true root permission directly. The reason for not isolating the net namespace is that network configurations need to be shared. The isolating a namespace includes isolating an MNT namespace, an IPC namespace, a UTS namespace, and a PID namespace.

(2.2) The child process calls the clone function clone( ) to obtain the grandchild process, and the grandchild process sends a communication-ready message to the parent process, and waits for a response (message ① in FIG. 6) from the parent process.

(2.3) The child process sends the process identification PID (message ① in FIG. 5) of the grandchild process to the parent process, the parent process sends an acknowledgment feedback (message ② in FIG. 5) to the child process after successfully receiving the message, and after receiving the acknowledgment feedback, the child process sends a message (message ③ in FIG. 5) to the parent process to notify the parent process that a task of the child process has been completed. Meanwhile, the parent process sets cgroups for the grandchild process after receiving the communication-ready message sent by the grandchild process, and sends a message (message ② in FIG. 6) to the grandchild process to notify the grandchild process that the grandchild process has obtained a resource.

In this embodiment, in the step (2.2), after the calling, by the child process, the clone function clone( ) to obtain the grandchild process, the process identification PID of the grandchild process in a new namespace is 1.

Referring to FIG. 4 and FIG. 6, the step (3) specifically includes the following steps: (3.1) The grandchild process first calls setsid( ) after receiving a message (message in FIG. 6), so that the grandchild process becomes a leading process of a new session to prevent the grandchild process from becoming an orphaned process after the parent process ends; then calls setuid(0) so that a command can be executed with root permission; then calls setgid(0) so that a file can be executed with permission of a group to which the file belongs; and finally sends a message (message ③ in FIG. 6) to the parent process to confirm end of communication.

(3.2) After the communication ends, as an independent process, the grandchild process sequentially prepares the overlay file system of the grandchild process, sets the hostname, and limits the permission by using the capability mechanism of the Linux kernel, completes these preparations, and finally executes the initialization script init.sh to start the container.

Figure 7:
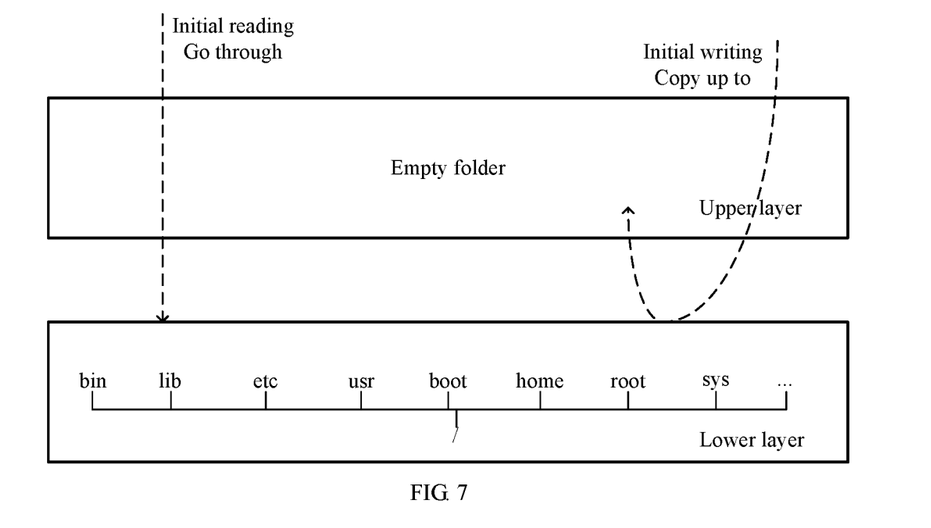
FIG. 7 is a structural diagram of an overlay file system designed according to an embodiment of the present invention.

As shown in FIG. 7, in this embodiment, the preparing an overlay file system of the grandchild process is specifically overlapping an empty folder on "/" of a host based on the overlay file system, changing the root to a merged folder, binding user directories of other users, and mounting an empty folder to the merged folder to hide content. The root is changed to the merged folder by overlaying the empty folder on "/" of the host based on the overlay file system, so that each user considers that the system environment is the same as that on the host. For all public files owned by the root, the lightweight CUE of this embodiment grants root permission to the user to read and modify them, so that the user can customize his/her own system environment. For example, the user may change glibc to another special version. In addition, when the user changes the glibc, the overlay file system places the new glibc on the upper layer without changing an original file system on the lower layer. This achieves a type of isolation. That is, modification of the user to the file system is visible only to the user and is invisible to others. A user directory of another user is bound and mounted to an empty folder to hide content in the directory, so that the user can be prevented from seeing the directory of the another user. In addition, the isolation of the file system can be further enhanced by cautiously providing the user with some functions that prevent the user from performing mount or unmount. Based on the overlay file system, "/" of the host is set as a lower layer, and another empty directory is set as a higher layer (as shown in FIG. 7). To update the system securely, the root user may alternatively open a user container, complete all updates, test them, and then merge the upper layer with the lower layer to make the updates take effect. Referring to FIG. 7, the overlay file system directly reads a directory or a file from the lower layer through the upper layer during initial reading, and copies the file up to the upper layer from the lower layer during initial writing. In this embodiment, the lightweight CUE enables non-root users to customize their own system files more freely, while ensuring privacy between users.

In this embodiment, the lightweight CUE is briefly referred to as a CUE, and has the following characteristics:

I. Namespace-Based Privacy Protection:

(1) Processes: A user should see only a process run by the user. All other processes should be invisible to the user. The CUE uses the Linux PID namespace and reloads a proc file system to achieve process isolation of the user container. (2) Hostname: Since the CUE allows users to customize system files and configuration files, the Linux UTS namespace is used in this embodiment to isolate hostnames. The user can customize the hostname. (3) Devices and networks: In the conventional multi-user model, devices are shared by all users. This is similar in the CUE, and the CUE does not isolate devices. Unlike virtual machines that virtualize devices for each user, the purpose of the CUE is to enhance the multi-user sharing model, instead of letting the users mistakenly consider that the devices belong only to them. In addition, device virtualization is too heavy-weight and may lead to large performance overheads, especially for high performance computing. Therefore, the CUE exposes a host device to the user container. For the same reason, the CUE does not virtualize network devices or use the net namespace in the Linux kernel.

II. Management and Customization of the System Environment

As has been described above in the introduction of the implementation of file system isolation, the CUE actually provides each user with a complete copy of the system environment and modification permission. Therefore, the users can make any customization without affecting other users. This is similar to a virtual machine. However, a difference is that an administrator of the virtual machine cannot uniformly customize an environment for each user, and the virtual machine is highly independent.

Referring to FIG. 7, the CUE provides all non-root users with an overlay folder as a root directory to ensure isolation, and the root user can see and manage only the lower layer. Therefore, if the root user makes any changes to the underlying layer, all users can see the changes. For example, if the root user changes /bin/python from version 2.7 to version 3.5, all users can see the update. In addition, if the user prefers to use python 2.7, the user can change the version back to 2.7 without affecting other users. Finally, once the user has made such a customization, the user can no longer see any update to the root directory of the file. Such an overlay feature is exactly expected in this embodiment. Generally, users can customize all content, and once they do so, the customized version has the highest priority. Files not customized by the users should be managed and updated by the root user.

III. Security Implementation

In order to enable non-root users to more flexibility customize their system environments, the CUE provides the users with partial root privileges in their own user containers. Each user logs in to the user container as a root user. The CUE relies on the features of Linux to impose fine-grained limits on things that users can do. The users can bypass checking of file and directory permissions. Therefore, the users can modify any file they want to modify. As described above, this embodiment uses an overlay file system to achieve isolation. Any modification is invisible to others. In this embodiment, for a file that is not expected to be seen or modified by others, an empty folder only needs to be mounted over the file using bind mount, or the file is remounted as read-only. To make this control stable, the user within the user container (that is, the root user within the container) is prohibited from executing mount or unmount in this embodiment. In terms of devices, this embodiment further uses the bind mount to allow the user to see a device that is expected to be seen by the user in this embodiment. This embodiment further uses the bind mount to achieve read and write control. Use of Mknod in the user container is prohibited, as this is the job of the true root user. All root permissions about the network are deleted from the user container.

All other privileges associated with system administration operations are deleted. For example, CAP_SYS_ADMIN and CAP_SYS_MODULE may enable access to the kernel. CAP_SYS_BOOT enables the user to perform operations that affect other users. Permissions for these operations are deleted from user permissions of the CUE. Specifically, the capability mechanism of the Linux kernel is used to set a corresponding whitelist of permissions and remove all permissions outside the whitelist. Finally, the CUE achieves isolation by using the Linux namespaces: The PID namespace isolates processes PIDs; the MNT namespace isolates changes to the file system; the UTS namespace isolates hostnames, and so on.

In summary, in the method for constructing a lightweight CUE in this embodiment, a lightweight CUE is constructed, thereby implementing a new concept somewhere between an application container and an operating system container: a user container, enabling users to customize environments more flexibly, achieving privacy isolation, and making it easier and more secure to update a system when multiple users share one computer. The method optimizes and enhances the multi-user concept of current operating systems and enables lightweight implementation. The method also helps deploy an application in a high-performance cluster. Currently, the method is applied to the prototype of Tianhe-3 exascale supercomputer. Test results show that the invention introduces negligible overheads.

In addition, this embodiment further provides a system for constructing a lightweight CUE, including a computer device, where the computer device is programmed or configured to perform the steps of the foregoing method for constructing a lightweight CUE in this embodiment. In addition, this embodiment further provides a system for constructing a lightweight CUE, including a computer device, where a storage medium of the computer device stores a computer program that is programmed or configured to perform the foregoing method for constructing a lightweight CUE in this embodiment. In addition, this embodiment further provides a computer readable storage medium, where the computer readable storage medium stores a computer program that is programmed or configured to perform the foregoing method for constructing a lightweight CUE in this embodiment.

The foregoing descriptions are only preferred implementations of the present invention, and the scope of the present invention is not limited to the foregoing embodiments. All technical solutions based on the idea of the present invention fall within the protection scope of the present invention. It should be pointed out that for a person of ordinary skilled in the art, several improvements and modifications may further be made without departing from the principle of the present invention, and the improvements and modifications should also be considered to fall within the protection scope of the present invention.

What is claimed is:

1. A method for constructing a lightweight container-based user environment (CUE), wherein the method comprises the following steps:
   (1) preparing, by a main process used to execute user environment construction, a socket pair for interprocess communication, calling a clone function, clone( ), to obtain a child process, and serving the main process as a parent process of the child process;
   (2) elevating permission of the child process to root, executing namespace isolation, calling the clone function, clone( ), to obtain a grandchild process, and sending a process identification (PID) of the grandchild process to the parent process, and setting, by the parent process, cgroups for the grandchild process according to the process identification (PID); and
   (3) setting, by the grandchild process, permission of the grandchild process to execute a command and a file, then as an independent process, sequentially preparing an overlay file system of the grandchild process, setting a hostname, and limiting permission by using a capability mechanism of a Linux kernel, executing an initialization script, init.sh, and finally constructing a container according to the initialization script.

2. The method for constructing a lightweight (CUE) according to claim 1, wherein the step (2) specifically comprises the following steps:
- (2.1) executing, by the child process, setresuid( ) so that the child process has permission of a root user, isolating a namespace, and retaining a user namespace and a net namespace not isolated;
- (2.2) calling, by the child process, the clone function clone( ) to obtain the grandchild process, and sending, by the grandchild process, a communication-ready message to the parent process, and waiting for a response from the parent process; and
- (2.3) sending, by the child process, the process identification (PID) of the grandchild process to the parent process, sending, by the parent process, an acknowledgment feedback to the child process after successfully receiving the communication-ready message, and sending, by the child process after receiving the acknowledgment feedback, a message to the parent process to notify the parent process that a task of the child process has been completed; and meanwhile, setting, by the parent process, cgroups for the grandchild process after receiving the communication-ready message sent by the grandchild process, and sending a message to the grandchild process to notify the grandchild process that the grandchild process has obtained a resource.

3. The method for constructing a lightweight (CUE) according to claim 2, wherein in the step (2.2), after the calling, by the child process, the clone function clone( ) to obtain the grandchild process, the process identification (PID) of the grandchild process in a new namespace is 1.

4. The method for constructing a lightweight (CUE) according to claim 1, wherein the step (3) specifically comprises the following steps:
- (3.1) calling, by the grandchild process, setsid( ) after receiving a message, so that the grandchild process becomes a leading process of a new session to prevent the grandchild process from becoming an orphaned process after the parent process ends; then calling setuid( ) so that a command can be executed with root permission; then calling setgid( ) so that a file can be executed with permission of a group to which the file belongs; and finally sending a message to the parent process to confirm end of communication; and
- (3.2) after the communication ends, sequentially preparing, by the grandchild process as an independent process, the overlay file system of the grandchild process, setting the hostname, and limiting the permission by using the capability mechanism of the Linux kernel, and finally executing the initialization script init.sh to start the container.

5. The method for constructing a lightweight (CUE) according to claim 1, wherein the preparing an overlay file system the grandchild process is specifically overlapping an empty folder on "/" of a host based on the overlay file system, changing the root to a merged folder, binding user directories of other users, and mounting an empty folder to the merged folder to hide content.

6. A system for constructing a lightweight (CUE), comprising a computer device having a memory, wherein the computer device is programmed or configured to perform the steps of the method for constructing a lightweight (CUE) according to claim 1.

7. A system for constructing a lightweight (CUE), comprising a computer device having a memory, wherein the computer device is programmed or configured to perform the steps of the method for constructing a lightweight (CUE) according to claim 2.

8. A system for constructing a lightweight (CUE), comprising a computer device having a memory, wherein the computer device is programmed or configured to perform the steps of the method for constructing a lightweight (CUE) according to claim 3.

9. A system for constructing a lightweight (CUE), comprising a computer device having a memory, wherein the computer device is programmed or configured to perform the steps of the method for constructing a lightweight (CUE) according to claim 4.

10. A system for constructing a lightweight (CUE), comprising a computer device having a memory, wherein the computer device is programmed or configured to perform the steps of the method for constructing a lightweight (CUE) according to claim 5.

11. A system for constructing a lightweight (CUE), comprising a computer device having a non-transitory computer readable storage medium, wherein the storage medium of the computer device stores a computer program that is programmed or configured to perform the method for constructing a lightweight (CUE) according to claim 1.

12. A system for constructing a lightweight (CUE), comprising a computer device having a non-transitory computer readable storage medium, wherein the storage medium of the computer device stores a computer program that is programmed or configured to perform the method for constructing a lightweight (CUE) according to claim 2.

13. A system for constructing a lightweight (CUE), comprising a computer device having a non-transitory computer readable storage medium, wherein the storage medium of the computer device stores a computer program that is programmed or configured to perform the method for constructing a lightweight (CUE) according to claim 3.

14. A system for constructing a lightweight (CUE), comprising a computer device having a non-transitory computer readable storage medium, wherein the storage medium of the computer device stores a computer program that is programmed or configured to perform the method for constructing a lightweight (CUE) according to claim 4.

15. A system for constructing a lightweight (CUE), comprising a computer device having a non-transitory computer readable storage medium, wherein the storage medium of the computer device stores a computer program that is programmed or configured to perform the method for constructing a lightweight (CUE) according to claim 5.

16. A non-transitory computer readable storage medium, wherein the computer readable storage medium stores a computer program that is programmed or configured to perform the method for constructing a lightweight (CUE) according to claim 1.

17. A non-transitory computer readable storage medium, wherein the computer readable storage medium stores a computer program that is programmed or configured to perform the method for constructing a lightweight (CUE) according to claim 2.

18. A non-transitory computer readable storage medium, wherein the computer readable storage medium stores a computer program that is programmed or configured to perform the method for constructing a lightweight (CUE) according to claim 3.

19. A non-transitory computer readable storage medium, wherein the computer readable storage medium stores a computer program that is programmed or configured to perform the method for constructing a lightweight (CUE) according to claim 4.

20. A non-transitory computer readable storage medium, wherein the computer readable storage medium stores a computer program that is programmed or configured to perform the method for constructing a lightweight (CUE) according to claim 5.

* * * * *